United States Patent
Beall et al.

(10) Patent No.: US 12,172,770 B2
(45) Date of Patent: Dec. 24, 2024

(54) AIRCRAFT ROTOR ASSEMBLY WITH SEGMENTED INPUT SHAFT FOR ELECTRIC MOTOR STACK AND GEARBOX UNIT

(71) Applicant: Textron Innovations Inc., Fort Worth, TX (US)

(72) Inventors: Grant Beall, Arlington, TX (US); Cody C. Anderson, Lantana, TX (US)

(73) Assignee: Textron Innovations Inc., Providence, RI (US)

( * ) Notice: Subject to any disclaimer, the term of this patent is extended or adjusted under 35 U.S.C. 154(b) by 50 days.

(21) Appl. No.: 17/748,960

(22) Filed: May 19, 2022

(65) Prior Publication Data

US 2022/0274715 A1    Sep. 1, 2022

Related U.S. Application Data

(63) Continuation of application No. 16/912,345, filed on Jun. 25, 2020, now Pat. No. 11,390,395.

(51) Int. Cl.
*B64D 35/08*    (2006.01)
*B64C 29/00*    (2006.01)
*B64D 27/24*    (2024.01)

(52) U.S. Cl.
CPC ............ *B64D 35/08* (2013.01); *B64D 27/24* (2013.01); *B64C 29/0033* (2013.01)

(58) Field of Classification Search
CPC ...... B64D 27/24; B64D 35/08; B64C 29/0033
USPC .................................................... 244/53 R
See application file for complete search history.

(56) References Cited

U.S. PATENT DOCUMENTS

| | | | |
|---|---|---|---|
| 3,797,783 A | 3/1974 | Kisovec | |
| 4,168,459 A | 9/1979 | Roesel, Jr. | |
| 4,476,395 A | 10/1984 | Cronin | |
| 5,990,590 A | 11/1999 | Roesel, Jr. et al. | |
| 6,719,244 B1 | 4/2004 | Gress | |
| 7,309,938 B1 | 12/2007 | Smith | |
| 8,469,306 B2 * | 6/2013 | Kuhn, Jr. | B64C 29/0033 244/12.4 |
| 9,156,545 B1 * | 10/2015 | Fenny | B64C 29/0033 |
| 9,823,022 B2 * | 11/2017 | Rollins | F28B 1/06 |
| 10,340,779 B2 | 7/2019 | Head et al. | |

(Continued)

FOREIGN PATENT DOCUMENTS

DE    112015003310 T5    3/2017
EP         3424819 A1    1/2019
(Continued)

OTHER PUBLICATIONS

EPO Examination Report issued in EP Application 21207937.0 mailed Apr. 2021, 8 pages.

(Continued)

*Primary Examiner* — Brady W Frazier
(74) *Attorney, Agent, or Firm* — Akona IP PC (57) ABSTRACT

A motor assembly is described and includes a housing; a plurality of motors disposed within the housing; and a drive shaft comprising a plurality of interconnected drive shaft segments, wherein each one of the drive shaft segments is driven by a different one of the motors connected to the drive shaft segment via an integrated overrunning clutch.

17 Claims, 8 Drawing Sheets

(56) References Cited

U.S. PATENT DOCUMENTS

| | | | |
|---|---|---|---|
| 2002/0079763 A1* | 6/2002 | Fleshman | H02K 5/132 310/112 |
| 2006/0037743 A1* | 2/2006 | Head | H02K 5/1285 166/66.4 |
| 2007/0152323 A1 | 7/2007 | Bish et al. | |
| 2007/0273225 A1* | 11/2007 | Head | F04D 13/10 310/152 |
| 2010/0219779 A1 | 9/2010 | Bradbrook | |
| 2011/0024555 A1* | 2/2011 | Kuhn, Jr. | B64C 29/0033 244/17.11 |
| 2011/0084561 A1* | 4/2011 | Swales | H02K 11/05 180/65.26 |
| 2011/0177748 A1 | 7/2011 | Luo | |
| 2012/0282103 A1* | 11/2012 | Muren | B64C 27/68 416/205 |
| 2013/0110333 A1 | 5/2013 | Song et al. | |
| 2013/0342084 A1 | 12/2013 | Su | |
| 2014/0151495 A1* | 6/2014 | Kuhn, Jr. | B64C 29/0016 244/17.11 |
| 2014/0159531 A1 | 6/2014 | Cho et al. | |
| 2014/0263855 A1 | 9/2014 | Ross et al. | |
| 2014/0299708 A1* | 10/2014 | Green | B64C 27/32 244/17.11 |
| 2015/0365022 A1 | 12/2015 | DiMarco | |
| 2016/0099628 A1* | 4/2016 | Ried | H02K 11/23 310/68 B |
| 2017/0190435 A1* | 7/2017 | Kobayashi | H02P 29/10 |
| 2017/0203839 A1 | 7/2017 | Giannini et al. | |
| 2017/0217600 A1* | 8/2017 | Regev | B64D 35/02 |
| 2018/0026504 A1 | 1/2018 | Huang | |
| 2018/0050811 A1* | 2/2018 | Niergarth | B64C 21/01 |
| 2018/0057157 A1* | 3/2018 | Groninga | B64C 27/20 |
| 2018/0065741 A1 | 3/2018 | Vondrell | |
| 2018/0251226 A1* | 9/2018 | Fenny | F01D 15/10 |
| 2018/0257761 A1* | 9/2018 | Oldroyd | B64C 29/02 |
| 2018/0362160 A1* | 12/2018 | Groninga | B64C 39/026 |
| 2019/0031336 A1* | 1/2019 | McCullough | B64C 29/0033 |
| 2019/0144126 A1* | 5/2019 | Groninga | B64C 29/0033 244/53 B |
| 2019/0149012 A1 | 5/2019 | Jackson | |
| 2019/0149018 A1 | 5/2019 | Lin | |
| 2019/0193835 A1* | 6/2019 | Sandberg | B64C 11/44 |
| 2019/0270516 A1* | 9/2019 | Sinusas | B64C 27/00 |
| 2019/0288571 A1 | 9/2019 | Lehikoinen et al. | |
| 2019/0301537 A1 | 10/2019 | Olson | |
| 2019/0329859 A1* | 10/2019 | Bevirt | B64C 23/005 |
| 2019/0389570 A1* | 12/2019 | Lauder | B64C 27/605 |
| 2020/0028389 A1 | 1/2020 | Long et al. | |
| 2020/0381984 A1 | 12/2020 | Sercombe et al. | |
| 2021/0039796 A1* | 2/2021 | Hirabayashi | B64D 35/08 |
| 2021/0399607 A1 | 12/2021 | Beall et al. | |
| 2021/0403173 A1 | 12/2021 | Speller et al. | |
| 2021/0403174 A1 | 12/2021 | Beall et al. | |

FOREIGN PATENT DOCUMENTS

| | | |
|---|---|---|
| EP | 3598616 A1 | 1/2020 |
| EP | 3738887 A1 | 11/2020 |
| EP | 3875375 | 11/2022 |
| GB | 1322169 A | 7/1973 |
| WO | 2010123601 A1 | 10/2010 |

OTHER PUBLICATIONS

USPTO Non-Final Office Action for U.S. Appl. No. 16/808,851 mailed on May 18, 2022.

* cited by examiner

AIRCRAFT ROTOR ASSEMBLY WITH SEGMENTED INPUT SHAFT FOR ELECTRIC MOTOR STACK AND GEARBOX UNIT

CROSS-REFERENCE TO RELATED APPLICATION

This application is a continuation and claims the benefit of priority under 35 U.S.C. § 120 of U.S. application Ser. No. 16/912,345 filed on Jun. 25, 2020, entitled "AIRCRAFT ROTOR ASSEMBLY WITH SEGMENTED INPUT SHAFT FOR ELECTRIC MOTOR STACK AND GEARBOX UNIT," Inventors: Grant Beall, et al. The disclosure of the prior application is considered part of and is incorporated in its entirety by reference in the disclosure of this application.

TECHNICAL FIELD

This disclosure relates in general to the field of aircraft and, more particularly, though not exclusively, to a segmented input shaft for an electric motor stack and gearbox unit in such aircraft.

BACKGROUND

An electric motor may be used by aircraft as a power source for various functions, such as supplying rotational energy in an aircraft propulsion system. In aircraft propulsion systems that utilize only a single motor, the lack of a backup motor increases the likelihood of a crash or other catastrophic condition should the motor fail. A single motor propulsion system also may not meet the power demands required by the propulsion system in the most efficient manner. Using two or more motors in a propulsion system addresses these concerns but may give rise to other issues.

SUMMARY

One embodiment is a motor assembly and includes a housing; a plurality of motors disposed within the housing; and a drive shaft comprising a plurality of interconnected drive shaft segments, wherein each one of the drive shaft segments is driven by a different one of the motors connected to the drive shaft segment via an integrated overrunning clutch.

Another embodiment is a rotor system comprising a gearbox; and a motor assembly comprising a housing; a plurality of motors disposed within the housing; and a drive shaft comprising a plurality of interconnected drive shaft segments, wherein each one of the drive shaft segments is driven by a different one of the motors connected to the drive shaft segment via an integrated overrunning clutch.

Yet another embodiment is an aircraft including a rotor assembly, the rotor system comprising a gearbox; and a motor assembly comprising a housing; a plurality of motors disposed within the housing; and a drive shaft comprising a plurality of interconnected drive shaft segments, wherein each one of the drive shaft segments is driven by a different one of the motors connected to the drive shaft segment via an integrated overrunning clutch.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is a design configuration for a propulsion motor overrunning clutch and segmented input shaft to the gearbox of an electric motor stack and gearbox unit. In accordance with features of embodiments described herein, each motor in the motor stack drives a gearbox input shaft segment that has a female splined receptacle exposed on a first end thereof and a male splined plug extending from a second end opposite the first end thereof. As the motors are assembled into a motor stack, the male end of the gearbox input shaft segment of each motor plugs into the female end of the gearbox input shaft segment of the previous motor. The gearbox includes a shaft segment having a splined connector (e.g., a male splined plug or a female splined receptacle) extending therefrom, which plugs into a corresponding splined connector (e.g., a female splined receptacle or a male splined plug) of the final motor, such that the input shaft segments combine to create a single segmented input shaft to the gearbox. As a result, a motor manufacturer can build and assemble the shaft segment and its associated clutch together with the motor in one location, process, and/or fixture to enable better quality control. Additionally, embodiments described herein for a segmented drive shaft eliminate manufacturing challenges that may be inherent in a single long driveshaft to the gearbox, including increased manufacturing costs as well as increased precision required to maintain proper tolerances along the entire piece and along the inner bore.

Figure 1A:
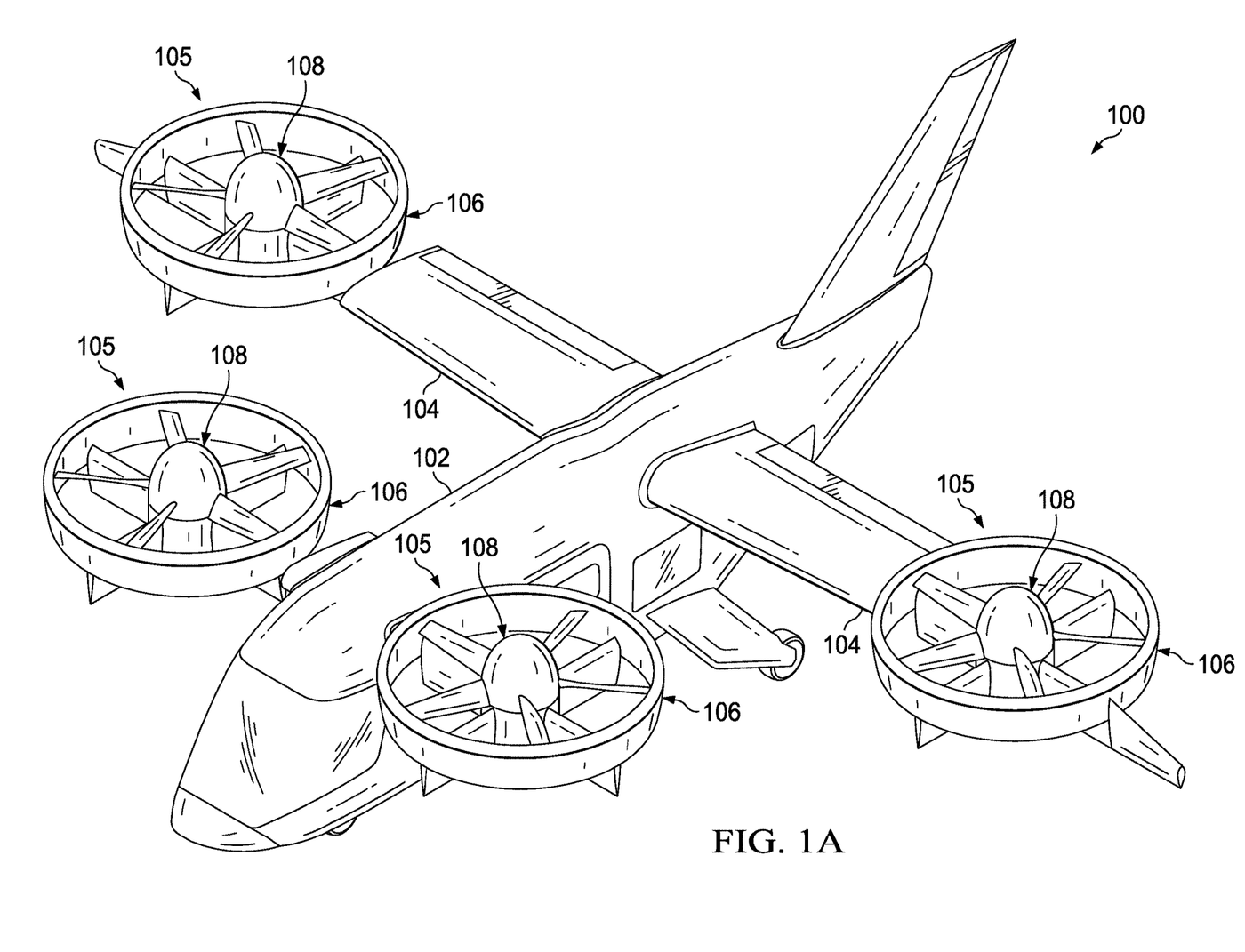
FIGS. 1A-1B illustrate a tilting ducted rotor aircraft including a segmented drive shaft for an electric motor stack and gearbox unit in accordance with embodiments described herein.
Figure 1B:
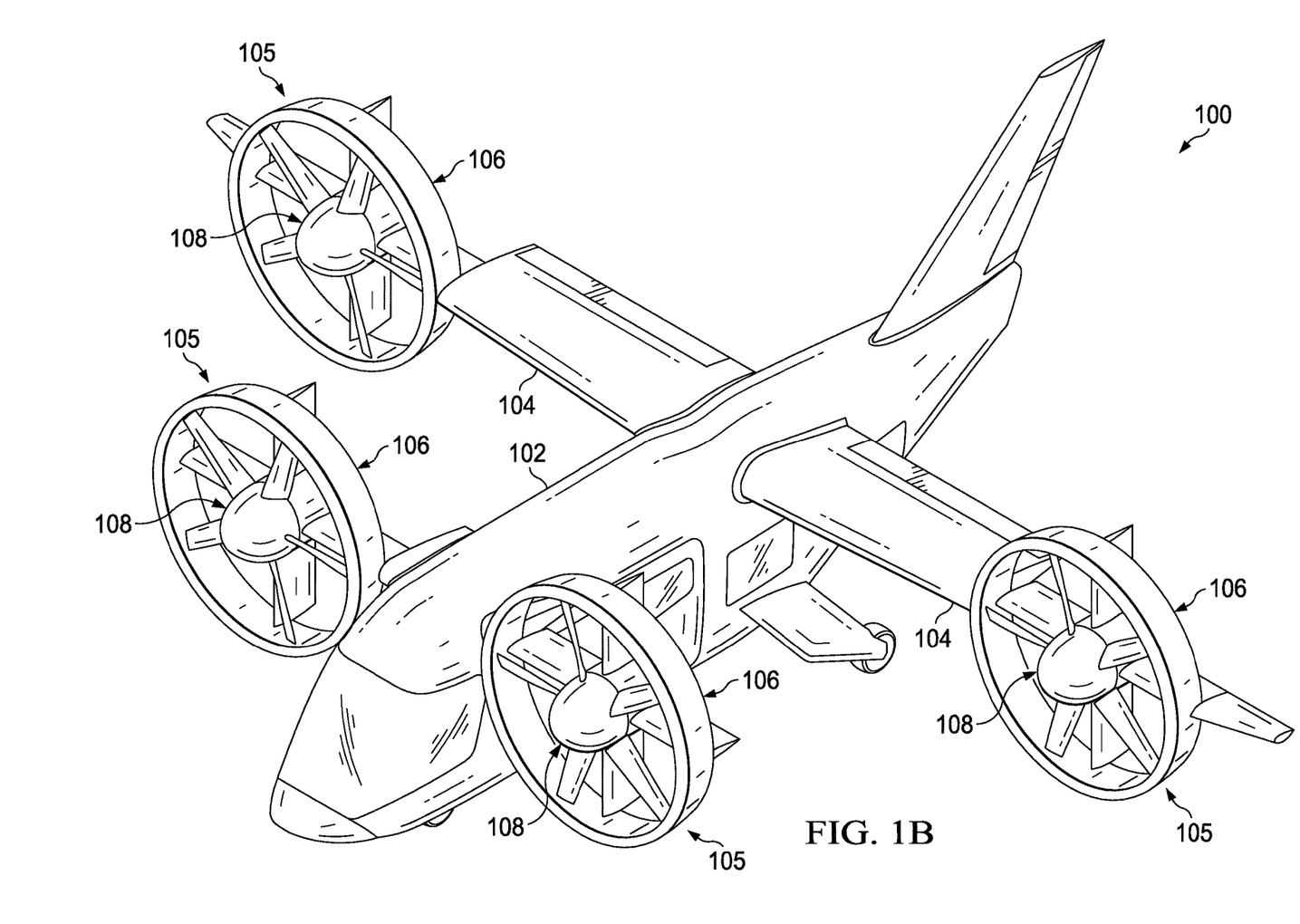
Figure 2:
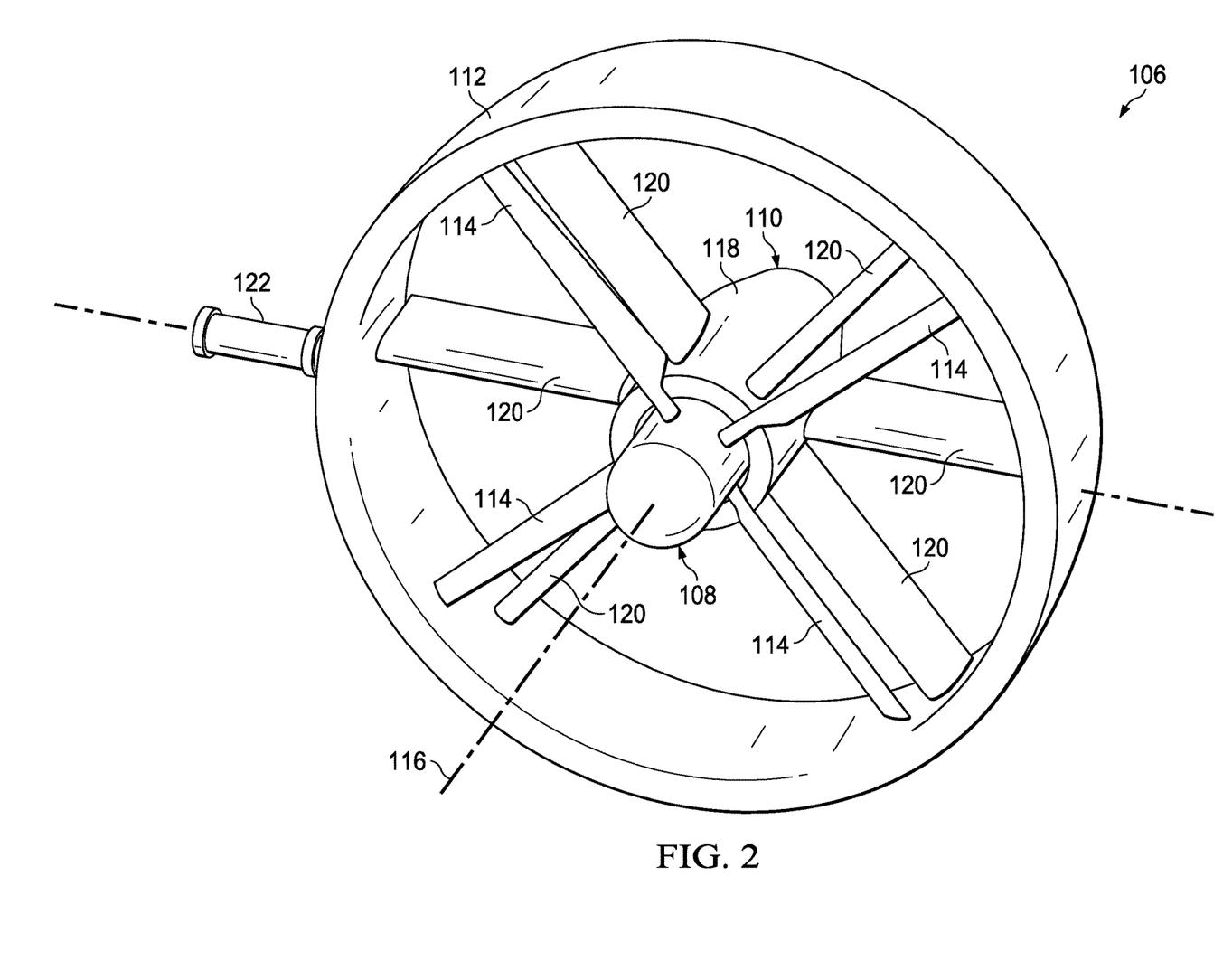
FIG. 2 illustrates a ducted rotor of the aircraft of FIGS. 1A-1B in accordance with embodiments described herein.

FIGS. 1A and 1B illustrate an example tiltrotor aircraft 100 that includes ducted rotors (or fans). The tiltrotor aircraft 100 is convertible between a helicopter mode (shown in FIG. 1A), which allows for vertical takeoff and landing, hovering, and low speed directional movement, and an airplane mode (shown in FIG. 1B), which allows for forward flight as well as horizontal takeoff and landing. Aircraft 100 includes a fuselage 102, wings 104, and a plurality propulsion assemblies 105 each comprising a ducted fan 106 rotatably coupled to fuselage 102 or wings 104. As best shown in FIG. 2, each ducted fan 106 includes a rotor assembly 108, a flow-straightening stator assembly 110, and a duct 112 surrounding rotor assembly 108 and stator assembly 110. Rotor assembly 108 includes a plurality of rotor blades 114 configured to rotate about a mast axis 116. Rotation of rotor blades 114 about mast axis 116 generates lift while operating in helicopter mode and thrust while operating in airplane mode. Stator assembly 110 is positioned downstream of rotor blades 114 and includes a stator hub 118 centrally located within duct 112 and a plurality of stator vanes 120 coupled between duct 112 and stator hub 118. Stator hub 118 may house an electric motor therein configured to produce rotational energy that drives the rotation of rotor assembly 108. Alternatively, stator hub 118 may house a gearbox therein that drives the rotation of rotor assembly 108, wherein the gearbox receives rotational energy from a driveshaft passing through an attachment post 122 and the adjacent stator vane 120.

Rotor blade assemblies 108 can be collectively manipulated to selectively control direction, thrust, and lift of tilting ducted fan aircraft 100. Indeed, the collective pitch of rotor blade assemblies 108 may be independently controlled from one another to allow for differential thrust output by ducted fans 106. For example, the collective pitch of the rotor blade assembly of one ducted fan may be higher or lower than the collective pitch of rotor blade assembly of another ducted fan such that the thrust generated by each ducted fan differs from each of the others.

Ducted fans 106 are each convertible, relative to fuselage 102, between a horizontal position, as shown in FIG. 1A, and a vertical position, as shown in FIG. 1B. Ducted fans 106 are in the horizontal position during vertical takeoff and landing mode. Vertical takeoff and landing mode may be considered to include hover operations of tilting ducted fan aircraft 100. Ducted fans 106 are in the vertical position during forward flight mode, in which tilting ducted fan aircraft 100 is in forward flight. In forward flight mode, ducted fans 106 direct their respective thrusts in the aft direction to propel tilting ducted fan aircraft 10 forward. Tilting ducted fan aircraft 100 is operable to fly in all directions during the vertical takeoff and landing mode configuration of FIG. 1A, although faster forward flight is achievable while in the forward flight mode configuration of FIG. 1B. Ducted fans 106 may be tiltable between the vertical and horizontal positions by a rotatable shafts (not shown) extending through wings 104 and which are rotatable in response to commands originating from a pilot and/or a flight control system.

Figure 3:
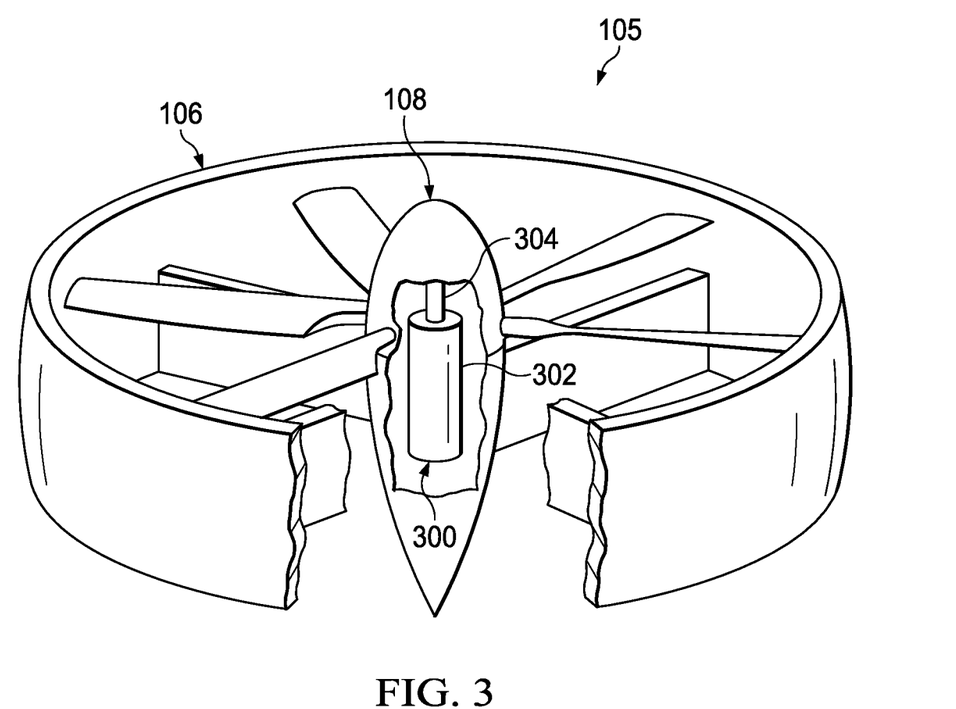
FIG. 3 is a close-up cutaway view of a portion of the ducted rotor of FIG. 2 in accordance with embodiments described herein.

As shown in FIG. 3, and as will be described in detail below, each of the propulsion assemblies 105 utilize an electric motor stack and gearbox unit 300 disposed within a respective rotatable pylon 302 as a power source to rotate the respective rotor hub assembly 108 via a rotor mast 304.

Figure 4A:
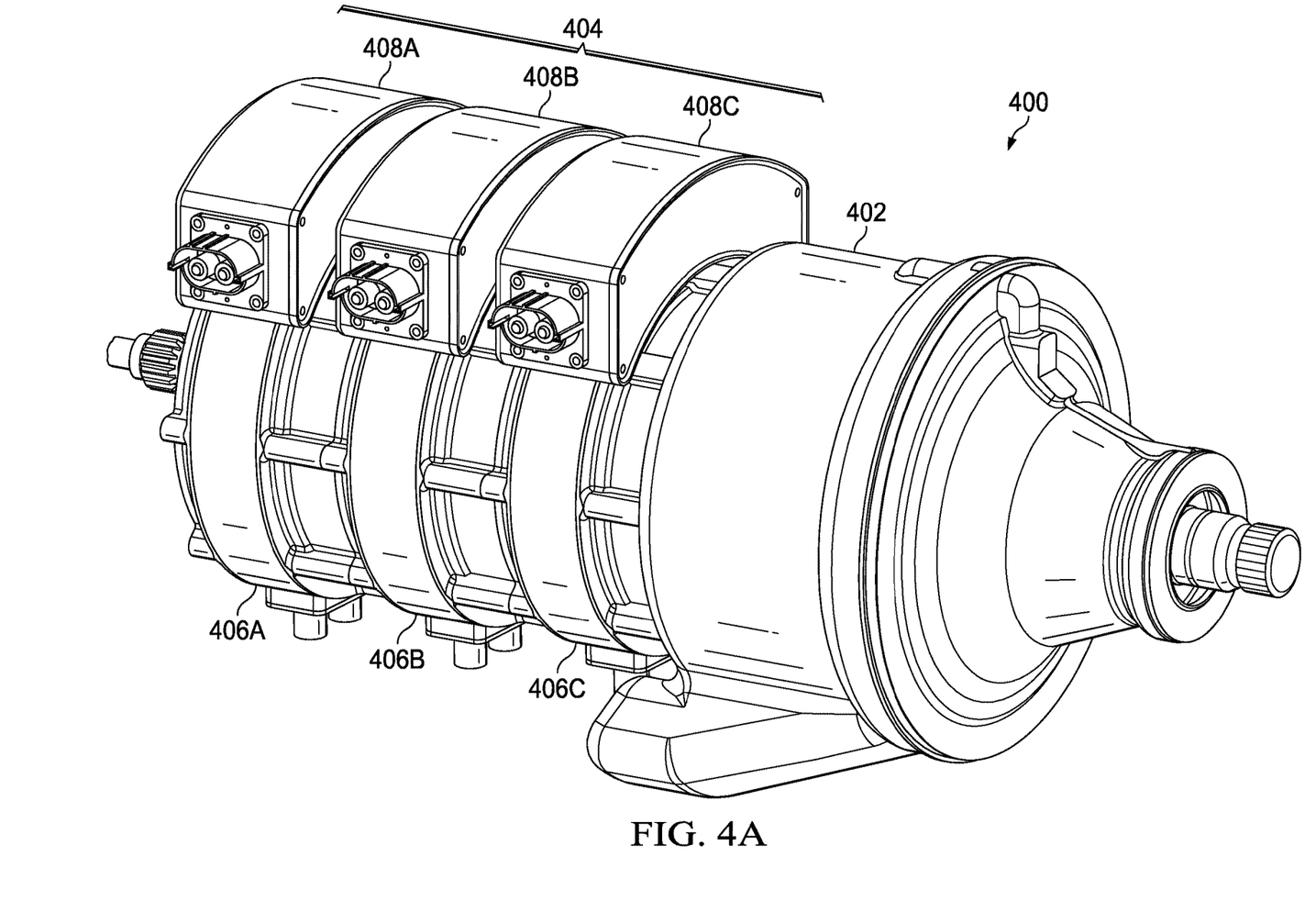
FIG. 4A illustrates an exterior of an example electric motor stack and gearbox unit electric motor stack and gearbox unit including a segmented drive shaft in accordance with embodiments described herein for implementation in aircraft having ducted rotors, such as that illustrated in FIGS. 1A-1B.

Referring now to FIG. 4A, illustrated therein is an electric motor stack and gearbox unit 400 that may be used as a power source to rotate a rotor hub assembly, such as rotor hub assembly 108 (FIGS. 1A and 1B), and that may be used to implement electric motor stack and gearbox unit 300 (FIG. 3). As shown in FIG. 4A, the unit 400 includes a gearbox 402 and an electric motor stack 404 comprising a plurality of electric motors 406A-406C and associated power electronics 408A-408C. In certain embodiments, electric motors 406A-406C may be implemented as axial or radial flux motor cores.

Figure 4B:
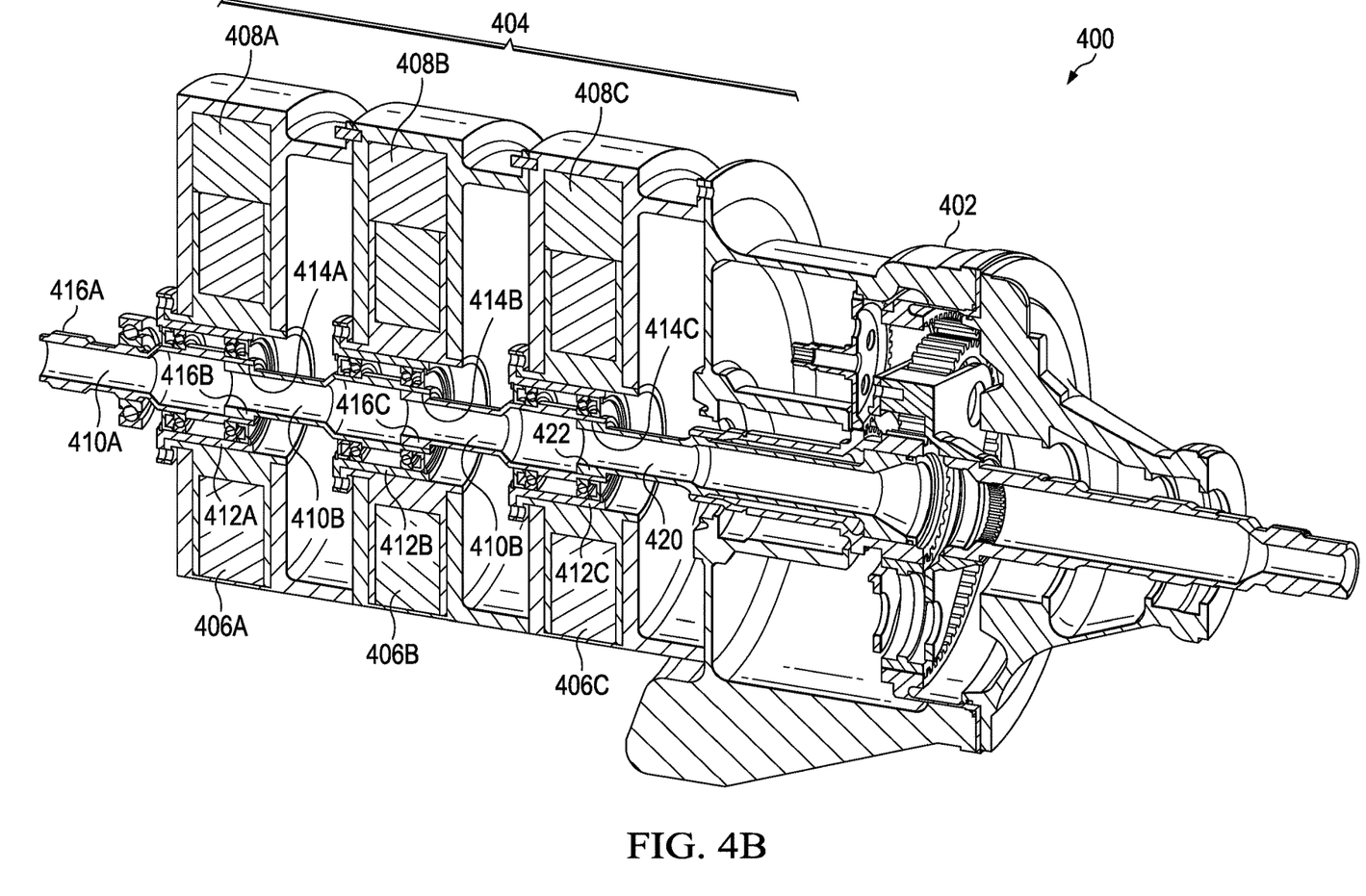
FIG. 4B illustrates a cutaway view of the example electric motor stack and gearbox unit including a segmented drive shaft illustrated in FIG. 4A.

4B illustrates a cutaway view of the electric motor stack and gearbox unit 400. As shown in FIG. 4B, each motor 406A-406C includes a gearbox input drive shaft segment 410A-410C, respectively. Gearbox input drive shaft segments 410A-410C are associated with motors 406A-406C via overrunning clutches 412A-412C. A first end of each of the gearbox input drive shaft segments 410A-410C includes a female splined receptacle 414A-414C. An opposite end of the gearbox input drive shaft segments 410A-410C, includes a male splined plug 416A-416C designed to be received and retained within the female splined receptacle 414A-414C of the immediately preceding motor 406A-406C. It will be recognized that the receptacles 414A-414C and plugs 416A-416C are appropriately sized to withstand application-specific loads.

In particular, as illustrated in FIG. 4B, the male splined plug 416C of motor 406C is received into the female splined receptacle 414B of motor 406B and the male splined plug 416B of motor 406B is received into the female splined receptacle 414A of motor 406A.

Gearbox 402 includes a drive shaft segment 420 extending from the motor stack facing end thereof that includes a male splined plug 422 that is received and retained in the female splined receptacle of the motor disposed on the gearbox facing end of the motor stack (e.g., the receptacle 414C of motor 406C). The segments 410A-410C and 422, interconnected via receptacles 414A-414C and extensions 416B, 416C, and 422, together comprise a segmented gearbox input drive shaft.

Figure 4C:
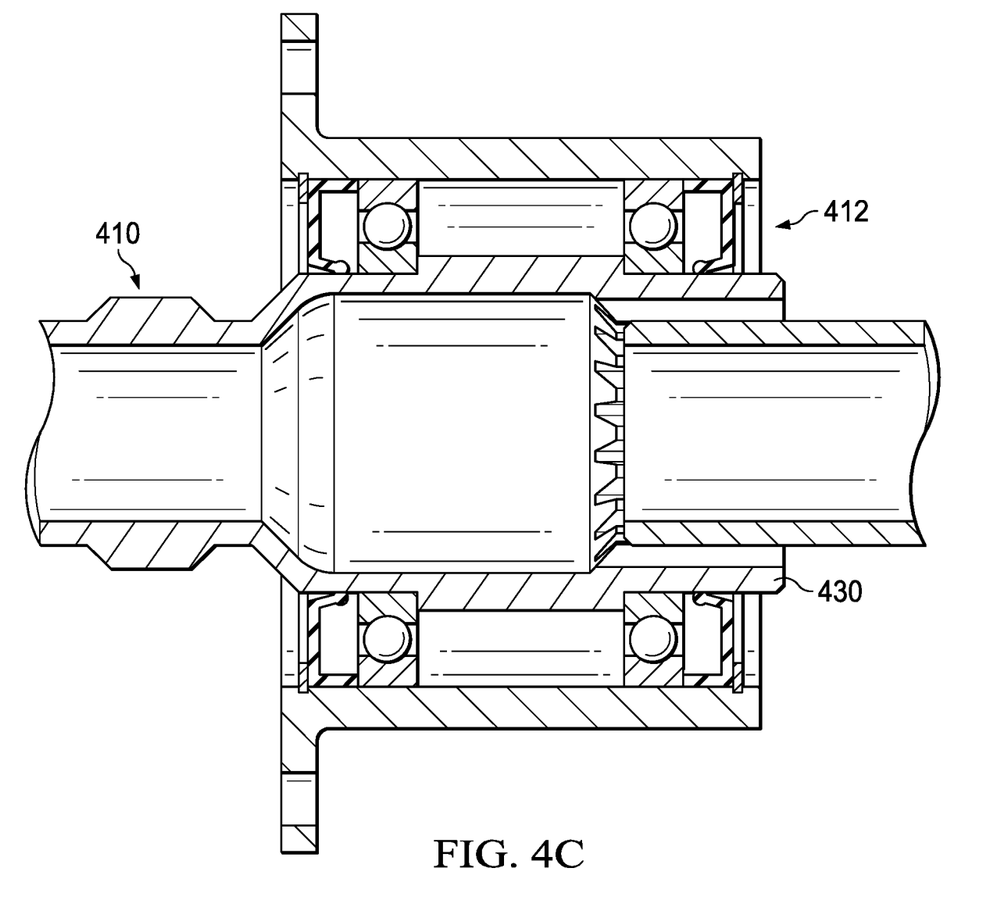
FIG. 4C illustrates a cutaway view of an overrunning clutch of the example electric motor stack and gearbox unit including a segmented drive shaft illustrated in FIG. 4A.

FIG. 4C is a cutaway view showing in greater detail the interconnection between overrunning clutches 412A-412C (represented in FIG. 4C by overrunning clutch 412) and respective drive shaft segments 410A-410C (represented in FIG. 4C by drive shaft segment 410) in accordance with embodiments described herein. In particular, as shown in FIG. 4C, an inner race 430 of overrunning clutch 412 is integrated with the drive shaft segment 410 (specifically, the end of the drive shaft segment 410 comprising female splined receptacle 414), instead of being implemented as a separate part that interfaces with the driveshaft via a spline toothed inner race, for example. As a result, the integration of overrunning clutch 412 and segment 410 is lighter weight and has a lower part count than such conventional implementations.

Figure 5:
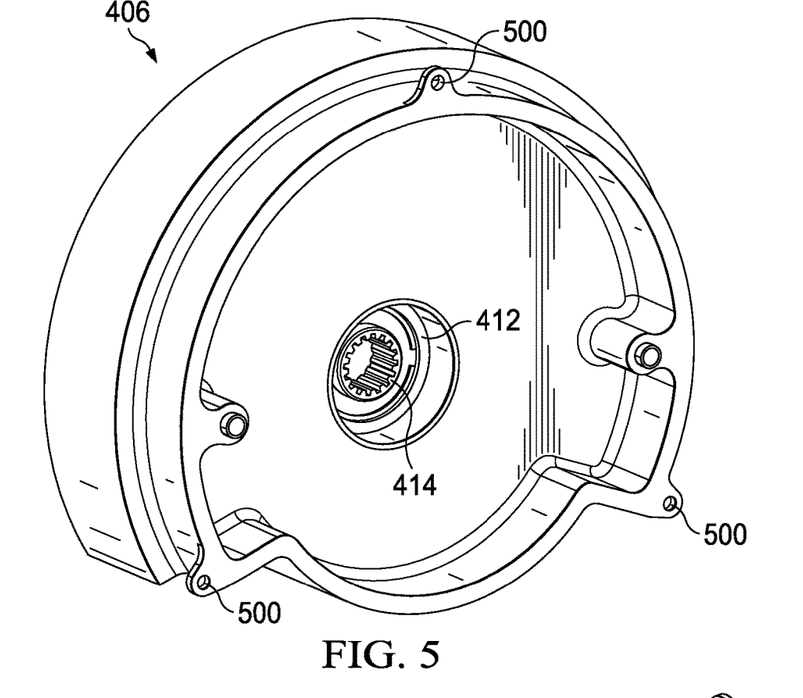
FIGS. 5 and 6 illustrate in greater detail opposite splined ends of a drive shaft segment as illustrated in FIG. 4B.
Figure 6:
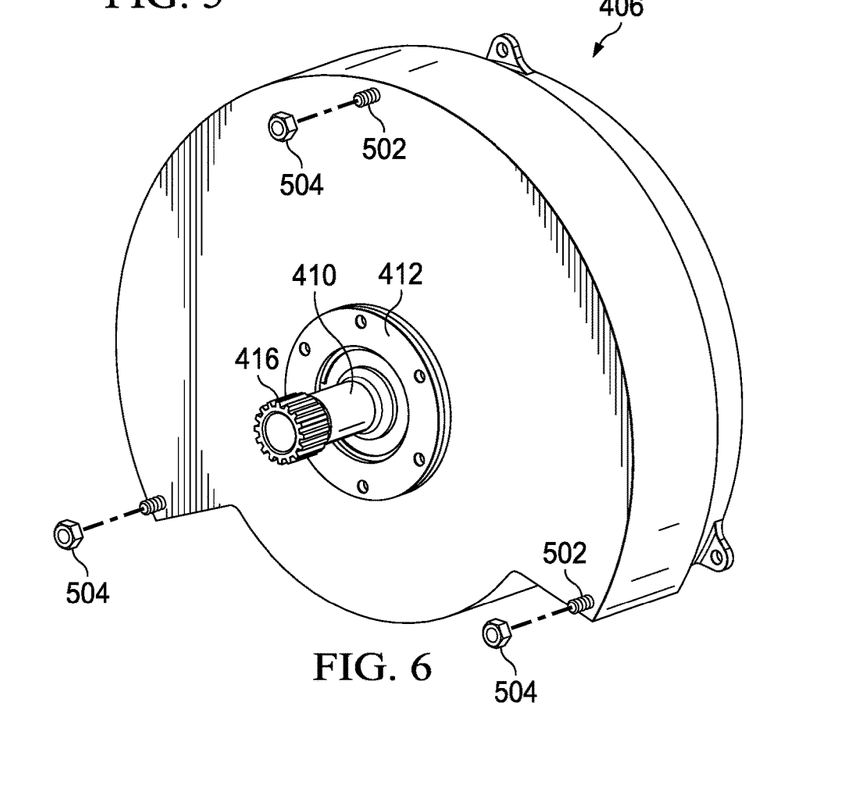

FIG. 5 illustrates in greater detail a female splined receptacle 414 (which may represent any of female splined receptacles 414A-414C) of motor 406 (which may represent any of motors 406A-406C). FIG. 6 illustrates in greater detail male splined plug 416 (which may represent any of male splined plugs 416A-416C) of drive shaft segment 410 (which may represent any of drive shaft segments 410A-410C) of motor 406. As illustrated in FIGS. 5 and 6, motor may include openings 500 around a periphery of one side thereof (e.g., the gearbox-facing side) and corresponding fastening members 502 disposed about a periphery of the opposite side thereof (e.g., the gearbox opposing side). When two motors are "stacked" together, the male splined plug of one is plugged into the female splined receptacle 414 of the other and the fastening members 502 of the former are received by and may be secured within the openings 500 of the latter (e.g., with nuts 504), thereby securing the two motors together. Additional motors may be attached in a similar fashion.

It should be noted that alternative means for interconnecting the individual drive shaft segments may be employed, with varying tradeoffs but without departing from the spirit or scope described herein. For example, ends of consecutive drive shaft segments may be connected to one another using an aerospace flexible coupling, a simple bolted flange coupling, or a curvic coupling, to name a few non-limiting examples. Additionally, the ends of the drive shaft segments on which the splined connectors (i.e., male splined plug and female splined receptacle) may be reversed such that the gearbox has extending therefrom a female splined receptacle that engages with a male splined plug of the final motor in the stack.

It should be appreciated that aircraft illustrated herein, such as ducted rotor aircraft 100, is merely illustrative of a variety of aircraft that can implement the embodiments disclosed herein. Indeed, the various embodiments of the electric motor stack and gearbox unit described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. As such, those skilled in the art will recognize that the embodiments described herein for an electric motor stack and gearbox unit can be integrated into a variety of aircraft configurations. It should be appreciated that even though aircraft are particularly well-suited to implement the embodiments of the present disclosure, non-aircraft vehicles and devices can also implement the embodiments.

The components of rotor assembly 108 may comprise any materials suitable for use with an aircraft rotor. For example, rotor blades 114 and rotor hub may comprise carbon fiber or aluminum; and rotor mast may comprise steel or titanium. While rotor hub assembly 108 are shown with four rotor blades 114, respectively, it should be understood that they may have as few as two rotor blades and may have more than four rotor blades.

In Example 1, a motor assembly includes a housing; a plurality of motors disposed within the housing; and a drive shaft comprising a plurality of interconnected drive shaft segments, wherein each one of the drive shaft segments is driven by a different one of the motors connected to the drive shaft segment via an integrated overrunning clutch.

In Example 2, the motor assembly of Example 1 may further include each of the motors comprising at least one of an axial flux motor core and a radial flux motor core.

In Example 3, the motor assembly of any of Examples 1-2 may further include a first end of each of the drive shaft segments comprising a male splined plug.

In Example 4, the motor assembly of any of Examples 1-3 may further include a second end of the drive shaft segments comprising a female splined receptacle for mating with one of the male splined plugs.

In Example 5, the motor assembly of any of Examples 1-4 may further include the plurality of motors being arranged in a stack such that the male splined plug of the drive shaft segment driven by a first one of the motors in the stack is received into a female splined receptacle of the drive shaft segment driven by a next one of the motors in the stack.

In Example 6, the motor assembly of any of Examples 1-5 may further include a splined connector of the drive shaft being driven by a final one of the motors in the motor stack engages with a splined connector of a gearbox.

In Example 7, the motor assembly of any of Examples 1-6 may further include the segmented drive shaft driving a drive shaft of the gearbox via the engagement between the splined connector of the drive shaft driven by the final one of the motors in the motor stack and the splined connector of the gearbox.

In Example 8, the motor assembly of any of Examples 1-7 may further include power electronics associated with the motors and disposed within the housing.

Example 9 is a rotor system comprising a gearbox; and a motor assembly comprising a housing; a plurality of motors disposed within the housing; and a drive shaft comprising a plurality of interconnected drive shaft segments, wherein each one of the drive shaft segments is driven by a different one of the motors connected to the drive shaft segment via an integrated overrunning clutch.

In Example 10, the rotor system of Example 9 may further include each of the motors comprising at least one of an axial flux motor core and a radial flux motor core.

In Example 11, the rotor system of any of Examples 9-10 may further include a first end of each of the drive shaft segments comprising a male splined plug and wherein a second end of the drive shaft segments comprising a female splined receptacle for mating with one of the male splined plugs.

In Example 12, the rotor system of any of Examples 9-11 may further include the plurality of motors being arranged in a stack such that the male splined plug of the drive shaft segment driven by a first one of the motors in the stack is received into a female splined receptacle of the drive shaft segment driven by a next one of the motors in the stack.

In Example 13, the rotor system of any of Examples 9-12 may further include a splined connector of the drive shaft being driven by a final one of the motors in the motor stack engages with a splined connector of a gearbox.

In Example 14, the motor assembly of any of Examples 9-13 may further include the segmented drive shaft driving a drive shaft of the gearbox via the engagement between the splined connector of the drive shaft driven by the final one of the motors in the motor stack and the splined connector of the gearbox.

In Example 15, the rotor system of any of Examples 9-14 may further include power electronics associated with the motors and disposed within the housing.

Example 16 is an aircraft including a rotor assembly, the rotor system comprising a gearbox; and a motor assembly comprising a housing; a plurality of motors disposed within the housing; and a drive shaft comprising a plurality of interconnected drive shaft segments, wherein each one of the drive shaft segments is driven by a different one of the motors connected to the drive shaft segment via an integrated overrunning clutch.

In Example 17, the aircraft of Example 16 may further include each of the motors comprising at least one of an axial flux motor core and a radial flux motor core.

In Example 18, the aircraft of any of Examples 16-17 may further include a first end of each of the drive shaft segments comprising a male splined plug and wherein a second end of the drive shaft segments comprising a female splined receptacle for mating with one of the male splined plugs.

In Example 19, the aircraft of any of Examples 16-18 may further include the plurality of motors being arranged in a stack such that the male splined plug of the drive shaft segment driven by a first one of the motors in the stack is received into a female splined receptacle of the drive shaft segment driven by a next one of the motors in the stack.

In Example 20, the aircraft of any of Examples 16-19 may further include a splined connector of the drive shaft being driven by a final one of the motors in the motor stack engages with a splined connector of a gearbox and the segmented drive shaft driving a drive shaft of the gearbox via the engagement between the splined connector of the drive shaft driven by the final one of the motors in the motor stack and the splined connector of the gearbox.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An apparatus comprising:
   a housing;
   first and second motor assemblies stacked within the housing, wherein each of the first and second motor assemblies comprises:
      a motor; and
      a drive shaft segment including an integrated overrunning clutch, wherein the drive shaft segment is configured to be driven by the motor via the integrated overrunning clutch, the drive shaft segment having a first end comprising a female connector portion accessible at a first side of the motor and a second end comprising a male connector portion extending from a second side of the motor opposite the first side;
   wherein the first end of the drive shaft segment of the first motor assembly engages with the second end of the drive shaft segment of the second motor assembly via engagement of the male connector portion of the second motor assembly with the female connector portion of the first motor assembly to form a segmented drive shaft, and
   wherein the engagement of the male connector portion of the second motor assembly and the female connector portion of the first motor assembly is within the first motor assembly.

2. The apparatus of claim 1, wherein each of the motors comprises an electric motor.

3. The apparatus of claim 2, wherein the electric motor comprises an axial flux motor core.

4. The apparatus of claim 2, wherein the electric motor comprises a radial flux motor core.

5. The apparatus of claim 1, wherein the male and female connector portions are splined.

6. The apparatus of claim 1, wherein the female connector portion of the drive shaft segment of the second motor assembly engages with a male connector portion comprising an end of an external driveshaft;
   wherein the engagement of the male connector portion of the second motor assembly and the female connector portion of the first motor assembly is within the first motor assembly.

7. The apparatus of claim 1 further comprising power electronics associated with the motors and disposed within the housing.

8. A rotor system comprising:
   a first motor assembly;
   a second motor assembly directly connected to the first motor assembly;
   wherein each of the first and second motor assemblies comprises:
      a motor; and
      a drive shaft segment having a first end accessible at a first side of the motor and a second end extending from a second side of the motor opposite the first side; and
      an overrunning clutch integrated with the drive shaft segment, wherein the drive shaft segment is configured to be driven by the motor via the integrated overrunning clutch;
   wherein the first end of the drive shaft segment of the first motor assembly comprises first type of structure configured to mate with a second type of structure comprising the second end of the drive shaft segment of the second motor assembly to form a segmented drive shaft, wherein the first type of structure comprises a female connector and the second type of structure comprises a male connector and the engagement occurs within the first motor assembly.

9. The rotor system of claim 8, wherein each of the motors comprises an electric motor.

10. The rotor system of claim 8, wherein the first and second types of structures are splined.

11. The rotor system of claim 8, wherein the first end of the drive shaft segment of the second motor assembly comprises a splined structure for engaging with a splined structure of an external driveshaft.

12. The rotor system of claim 11, wherein the external driveshaft is configured to drive a mechanical system.

13. An aircraft including a rotor system, the rotor system comprising:

a housing; and first and second motor assemblies stacked within the housing, wherein each of the first and second motor assemblies comprises:
- a motor; and
- a drive shaft segment including an integrated overrunning clutch, wherein the drive shaft segment is configured to be driven by the motor via the integrated overrunning clutch, the drive shaft segment having a first end comprising a female connector portion accessible at a first side of the motor and a second end comprising a male connector portion extending from a second side of the motor opposite the first side;

wherein the first end of the drive shaft segment of the first motor assembly engages with the second end of the drive shaft segment of the second motor assembly via engagement of the male connector portion of the second motor assembly with the female connector portion of the first motor assembly to form a segmented drive shaft, and wherein the engagement of the male connector portion of the second motor assembly and the female connector portion of the first motor assembly is within the first motor assembly.

14. The aircraft of claim 13, wherein each of the motors comprises one of an axial flux motor core and a radial flux motor core.

15. The aircraft of claim 13, wherein the male and female connector portions are splined.

16. The apparatus of claim 1, wherein the female connector portion of the drive shaft segment of the second motor assembly engages with a male connector of a mechanical system other than another motor, wherein the stacked first and second motor assemblies are configured to drive the mechanical system.

17. The apparatus of claim 6, wherein the engagement of the female connector portion of the second motor assembly and the male connector portion of the external driveshaft is within the second motor assembly.

* * * * *